F. R. BARKER & J. GREENWOOD.
DIVISIBLE RIM.
APPLICATION FILED AUG. 24, 1910.

994,237.

Patented June 6, 1911.

Witnesses:
Sydney E. Taft.
Franklin E. Low.

Inventors:
Frederic R. Barker,
Joseph Greenwood,
by their Atty Charles S. Gooding.

UNITED STATES PATENT OFFICE.

FREDERIC R. BARKER, OF BOSTON, AND JOSEPH GREENWOOD, OF WALPOLE, MASSACHUSETTS.

DIVISIBLE RIM.

994,237.     Specification of Letters Patent.     Patented June 6, 1911.

Application filed August 24, 1910. Serial No. 578,760.

*To all whom it may concern:*

Be it known that we, FREDERIC R. BARKER, a subject of King George V of England, residing at Boston, in the county of Suffolk, and Joseph Greenwood, a citizen of the United States, residing at Walpole, in the county of Norfolk, both in the State of Massachusetts, have invented new and useful Improvements in Divisible Rims, of which the following is a specification.

This invention relates to improvements in rims for vehicle wheels and particularly to a special class commonly known to those skilled in the art as quick-detachable rims but which might be more appropriately called divisible rims and which are used in connection with pneumatic tires. In rims of this class there is provided a side ring or flange commonly called a bead which is detachable from the rim to allow the tire to be removed from the rim in order that the inner tube may be removed from the outer casing or shoe for repair or replacement.

The object of our invention is to provide means whereby the detachable bead may be more quickly and conveniently removed and replaced than has been possible in the use of devices of this class heretofore.

The object is further to provide a device of this class in which the device, though quickly detachable at will, shall nevertheless be normally securely locked to the rim so that accidental removal shall be impossible.

To these ends, our invention consists in the novel features of construction and in the combination and arrangement of parts set forth in the following specification and particularly pointed out in the claims.

Figure 1:
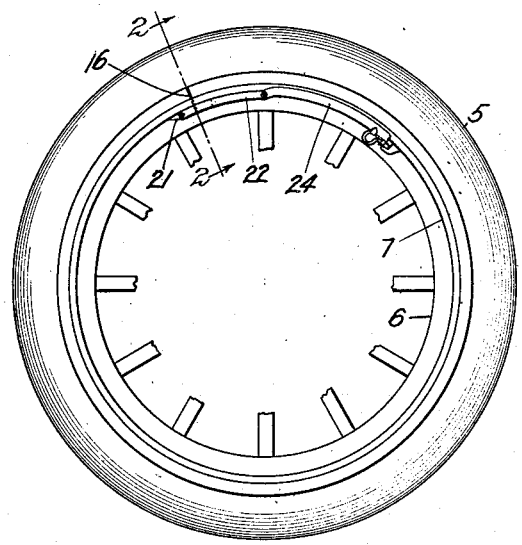
Figure 2:
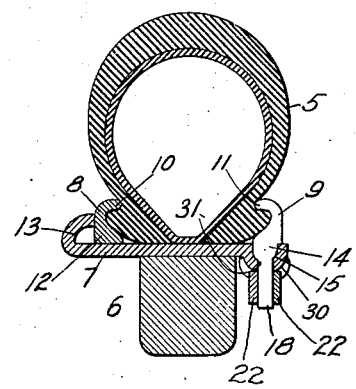
Figure 3:
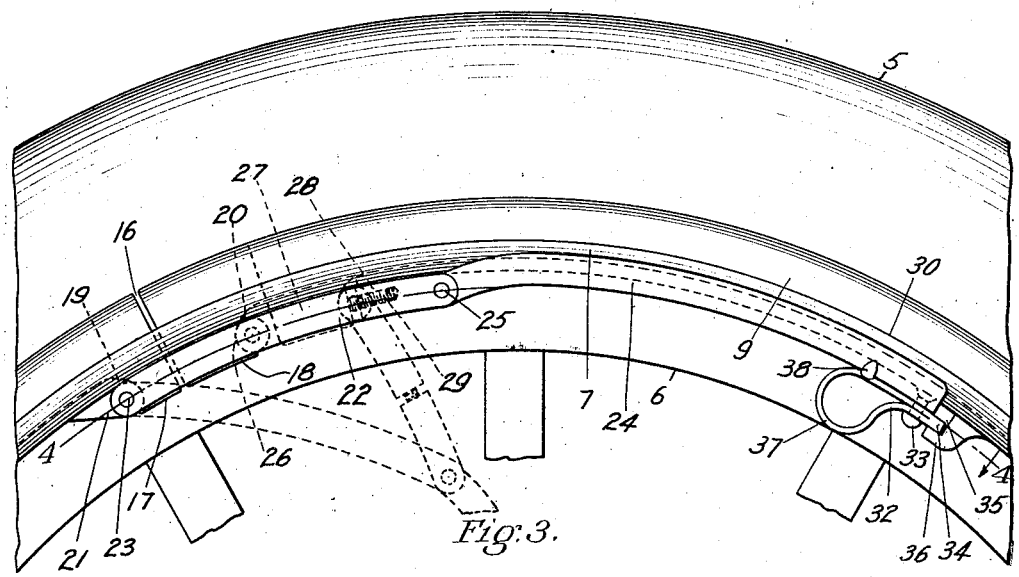
Figure 4:
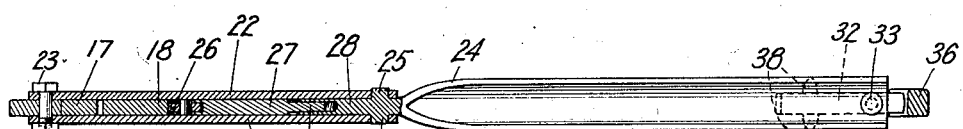

Referring to the drawing: Figure 1 is a side elevation of a divisible rim embodying our invention showing the same in connection with the wheel and tire, the hub and part of the spokes being broken away. Fig. 2 is an enlarged sectional view taken or line 2—2 of Fig. 1, looking in the direction of the arrows. Fig. 3 is an enlarged detail side elevation of a portion of the rim, tire and wheel showing the means for securing the bead to the rim. Fig. 4 is a sectional view taken on line 4—4 of Fig. 3, looking in the direction of the arrows on said line.

Like numerals refer to like parts throughout the several views of the drawing.

In the drawing, 5 is a tire and 6 a wheel both of which may be of any usual or desired construction, the wheel being provided with a rim 7. Mounted on the rim 7 are two removable rings or flanges 8 and 9 commonly called beads. Preferably, these beads are provided with lips or flanges 10 and 11, respectively, which, when turned inwardly toward each other, as shown in Fig. 2, are adapted to receive a tire of the "clencher" type, and when reversed are adapted to receive a tire of the "Dunlop" type, and for this purpose the bead 8 is provided also with a flange 12 which, when the bead is reversed from the position shown in Fig. 2, is adapted to fit into a corresponding annular recess 13 provided in the rim 7. The bead 9 is preferably provided with an annular lip or projection 14 located in a corresponding annular groove 15 provided in the rim 7. The bead 9 is both radially and circumferentially extensible and contractible and to this end is interrupted or split at 16 and is provided on opposite sides of this split or slot with lugs 17 and 18, these lugs being provided, respectively, with oppositely disposed recesses 19 and 20, preferably of the curved form shown in Fig. 3. The rim 7 is provided with suitable means such, for example, as an ear 21 having a rounded end fitting the recess 19 of the lug 17, as shown in Fig. 3, and to this ear a pair of links 22 are pivoted upon a suitable pivot 23. To the other pair of ends of these links a lever 24 is pivoted in any suitable manner as, for example, by providing said lever with two integral bosses 25 extending through said links, as shown in Fig. 4. The lever 24 and links 22 constitute a toggle which although requiring the exercise of only a moderate force at the free end of the lever 24 draws the lugs 17 and 18 together with a very powerful action.

The lever 24 may directly engage the lug 18, if desired, but preferably said lever is provided with a roll 26 journaled thereon and fitting the curved recess 20, as shown in Fig. 3. Preferably, the lever 24 is provided with a means of adjustment so that the distance between its axis and that point in the periphery of the roll 26 which engages the lug 18 may be varied and to this end, said lever is preferably made in two parts 27 and 28, the part 27 being provided with a shank 29 having screw-threaded engagement with the part 27, as shown particularly in Fig. 4. Of course, when the part 27 is located between the links 22, said part will be held against rotation with respect to the part 28, but when the part 27 is withdrawn from between said links it may be rotated one or more complete rotations as may be required in order to vary the length of the short arm of the lever 24 for the purpose of determining the distance to which the lugs 17 and 18 will be drawn toward each other, as will appear hereinafter. The longer arm of the lever 24 which is preferably concavo-convex in cross section is also curved longitudinally concentric with the rim and fits a correspondingly shaped flange 30 in which the groove 15 is formed.

The bead 9 is preferably elastic and is so constructed that when released it expands or, in other words, its diameter and circumference increase so that the lugs 17 and 18 spring apart in the manner indicated in dotted lines in Fig. 3. Consequently, if the lever 24 be swung from the position shown in full lines in Fig. 3 to the position shown in dotted lines therein, said lever will swing upon the lug 18 as a fulcrum and the links 22 will swing upon the lug 21 as a fulcrum in the manner indicated in dotted lines in Fig. 3, said lever and link continuing to swing downwardly toward the left until the lugs 17 and 18 are freed so that they may be withdrawn upwardly through a slot 31 in the rim 7 through which they project. In this way, the bead 9 having been freed may be entirely removed from the rim 7 to permit the removal of the tire 5 by sliding the same laterally across the space previously occupied by said bead. The bead is returned to its place by a reversal of the foregoing operation, it being understood that the roll 26 will be first positioned in the recess 20 in the lug 18 and the lever 24 will be swung upwardly toward the right into the position shown in full lines in Fig. 3, it being observed that when it reaches this position the axes of the pivots 23 and 25 and the axis of the roll 26 are approximately in a straight line, and, in practice, so nearly so as to practically lock the parts in their normal position. As a further safeguard, however, the lever 24 may be provided with a suitable additional locking means such, for example, as a locking member 32 mounted upon a pivot 33 on said lever and having a short arm 34 normally located in a recess 35 provided in a lug 36 on the rim 7. The locking member 32 may, if desired, be provided with an eye 37 into which the operator's finger may be inserted in order to swing said member laterally to disengage it from the lug 36. If desired, the eye 37 may be made somewhat resilient and may be provided with a pair of detents 38, see Figs. 3 and 4, engaging the convexly curved surface of the lever 24 and thus acting to normally hold the locking member in longitudinal alinement with said lever. These detents may be freed from the lever by springing the locking member downwardly or by applying sufficient force to said member laterally to cause the detents to be freed from the lever by springing downwardly. This device prevents jarring and vibration from displacing the parts and consequently the bead is always securely locked when in its normal position and yet may be very rapidly and conveniently detached, since this is accomplished by merely unlocking the lever 24 and swinging the same inwardly toward the center of the wheel with a quick movement, as distinguished from the slow and clumsy methods at present employed for attaching and detaching beads.

Having thus described our invention, what we claim and desire by Letters Patent to secure is:

1. The combination of a rim provided with a slot, an expansible and contractible bead provided with a pair of lugs extending through said slot, and lever means fulcrumed on said rim and normally engaging one of said lugs as a fulcrum for drawing said lugs toward each other thereby to contract said bead.

2. The combination of a rim provided with a slot, an expansible and contractible bead provided with a pair of lugs extending through said slot, means on said rim engaging one of said lugs, a link pivoted at one end to said rim, and a lever pivoted to said link and connected to the other of said lugs whereby the latter of said lugs may be drawn toward the former.

3. The combination of a rim provided with a slot, an expansible and contractible bead provided with a pair of oppositely recessed lugs extending through said slot, means on said rim interengaging with the recess of one of said lugs, a lever interengaging with the recess of the other of said lugs, and means connecting said lever with said rim and extending across said lugs whereby said lever is adapted to draw said lugs toward each other.

4. The combination with a rim, of an expansible and contractible ring provided with two lugs, lever means connected to said lugs for drawing the same toward each other thereby to contract said ring, and a roll on said lever means engaging one of said lugs.

5. The combination of a rim, an expansible and contractible ring mounted on said rim, a link pivoted to said rim, and a lever pivoted to said link and engaging said ring between the pivotal connections between said link and said lever and between said link and said rim.

6. The combination of a rim, an expansible and contractible ring mounted on said rim, a link pivoted to said rim, a lever pivoted to said link, a pair of lugs located between the pivots of said link, one of said lugs being normally engaged by said lever and constituting a fulcrum therefor, and means on said rim engaging the other of said lugs.

7. The combination of a rim provided with a circumferential groove, and provided with a slot, a bead located in said groove and provided with a pair of lugs projecting through said slot, a link pivoted to said rim at one side of said lugs, and a lever pivoted between its ends to said link at the other side of said lugs and engaging the nearer of said lugs as a fulcrum.

8. The combination of a rim provided with a circumferential groove, and provided with a slot, a bead located in said groove and provided with a pair of lugs projecting through said slot, a link pivoted to said rim at one side of said lugs, a lever pivoted between its ends to said link at the other side of said lugs and engaging the nearer of said lugs as a fulcrum, and means pivoted on said lever and interengaging with said rim to lock said lever against swinging movement.

9. The combination of a rim provided with a circumferential groove, and provided with a slot, a bead located in said groove and having a pair of lugs projecting through said slot, a pair of links pivoted to said rim and straddling said lugs, means on said rim engaging one of said lugs, and a lever interposed between and pivoted between its ends to said links and engaging the other of said lugs as a fulcrum.

10. The combination with a rim, of an expansible and contractible bead mounted on said rim and having means to hold said rim and bead against relative circumferential movement in one direction and means for contracting said bead comprising a link and a lever pivoted to each other, said link being pivotally connected to said rim and said lever engaging a portion of said bead as a fulcrum between the ends of said link.

11. The combination with a rim, of an expansible and contractible bead mounted on said rim, and means for contracting said bead comprising a link and a lever pivoted to each other and fulcrumed respectively on said rim and said bead, said link and said lever normally lying in the same plane.

In testimony whereof we have hereunto set our hands in presence of two subscribing witnesses.

FREDERIC R. BARKER.
JOSEPH GREENWOOD.

Witnesses:
LOUIS A. JONES,
SYDNEY E. TAFT.

---

Copies of this patent may be obtained for five cents each, by addressing the "Commissioner of Patents, Washington, D. C."